United States Patent
Jung et al.

(10) Patent No.: US 8,099,893 B2
(45) Date of Patent: Jan. 24, 2012

(54) METHOD FOR PERMANENT DISTURBANCE/DESTRUCTION OF ELECTRONICS, IN PARTICULAR OF A BLAST CASE OR THE LIKE

(75) Inventors: Markus Jung, Eicklingen (DE); Gerd Wollmann, Celle (DE)

(73) Assignee: Rheinmetall Waffe Munition GmbH, Ratingen (DE)

( * ) Notice: Subject to any disclaimer, the term of this patent is extended or adjusted under 35 U.S.C. 154(b) by 198 days.

(21) Appl. No.: 12/377,727

(22) PCT Filed: Jul. 20, 2007

(86) PCT No.: PCT/EP2007/006460
§ 371 (c)(1),
(2), (4) Date: Feb. 17, 2009

(87) PCT Pub. No.: WO2008/019749
PCT Pub. Date: Feb. 21, 2008

(65) Prior Publication Data
US 2010/0289686 A1    Nov. 18, 2010

(30) Foreign Application Priority Data
Aug. 17, 2006 (DE) .......................... 10 2006 038 626

(51) Int. Cl.
*G01S 7/42* (2006.01)
(52) U.S. Cl. .............................. 42/14; 455/1
(58) Field of Classification Search ............... 342/13–14; 455/1
See application file for complete search history.

(56) References Cited

U.S. PATENT DOCUMENTS

| | | | |
|---|---|---|---|
| 6,163,259 A * | 12/2000 | Barsumian et al. | 340/572.2 |
| 7,512,511 B1 * | 3/2009 | Schultz et al. | 702/127 |
| 2004/0095243 A1 | 5/2004 | Holmes et al. | |
| 2006/0082488 A1 * | 4/2006 | Keller, III | 342/22 |
| 2006/0132127 A1 * | 6/2006 | Fullerton | 324/300 |
| 2006/0164283 A1 | 7/2006 | Karlsson | |
| 2008/0129600 A1 * | 6/2008 | Thomas | 342/465 |

FOREIGN PATENT DOCUMENTS

| | | |
|---|---|---|
| WO | 02065419 | 8/2002 |
| WO | 2004038455 | 5/2004 |

OTHER PUBLICATIONS

"Terror-Abwehr mit High-Tech: HPEM von Rheinmetall gegen Sprengfallen" [Online] Nov. 23, 2005, pp. 1-3 XP002455792 Retrieved from the Internet: URL http://www.rheinmetall-defence.com/index.php?lang=2&fid=3305 [retrieved on Oct. 27, 2007].

\* cited by examiner

*Primary Examiner* — Timothy A Brainard
(74) *Attorney, Agent, or Firm* — Lucas & Mercanti, LLP; Klaus P. Stoffel

(57) ABSTRACT

In a first step, it is proposed that tunable transmitters and detectors (receivers) be included in a detection system and that a narrowband, preferably variable frequency signal be used in order to determine the frequencies for optimum injection into the electronics of a target. When the detection system identifies these frequencies, destruction can be initiated in the second step of the invention for a transmitter or receiver which is communicating with the target. For this purpose, once the optimum frequencies have been determined, a high-power signal is transmitted into the local area of the target at the specific/determined frequency. The evaluation unit, which is integrated in the detection system, controls the transmission frequencies, evaluates the harmonic signals, selects the optimum frequencies for an attack, and controls and checks the attack process.

18 Claims, 1 Drawing Sheet

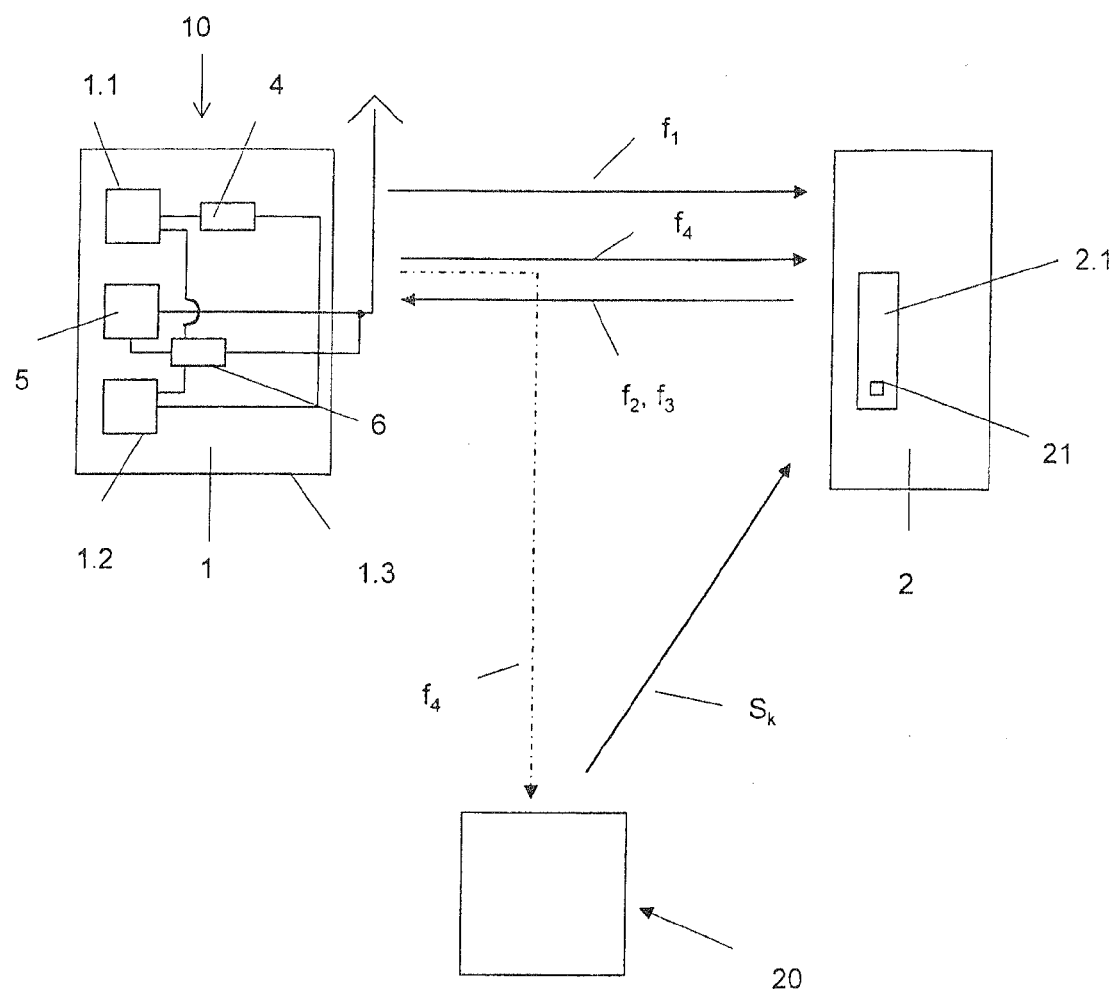

METHOD FOR PERMANENT DISTURBANCE/DESTRUCTION OF ELECTRONICS, IN PARTICULAR OF A BLAST CASE OR THE LIKE

BACKGROUND OF THE INVENTION

The invention concerns a method by which permanent disturbance/destruction of a transmitter or a receiver, for example, as a component of an IED (Improvised Explosive Device), is possible, so that triggering at the receiver end can be prevented.

IED's are devices that usually consist of four major groups of components: a trigger for electrically triggering the device, a safe and arm unit, explosives, alone or combined with poisonous chemicals, toxic biological materials or radiological material, and an effector. Radio-controlled triggering units, so-called RCIED's, are usually used for triggering the internal electric trigger.

A well-known method and a well-known device for interfering with a line of communication between at least one transmitter and at least one receiver involves the use of jamming transmitters (jammers). The function of a jammer generally consists in interfering with all of the receivers within its effective range. To this end, an interfering signal of sufficient strength, for example, a noise signal with no information content, is superposed on a useful signal transmitted between transmitter and receiver to mask the useful signal and prevent it from being used by the receiver. However, for example, as soon as the interference range of the jammer is exceeded, the danger of triggering is again present. Furthermore, a jammer does not transmit continuously but rather intermittently.

SUMMARY OF THE INVENTION

The objective of the invention then is to specify a method and a device that make it possible to create a permanent interruption between a transmitter and a receiver interacting with it.

In this connection, the invention is based on the consideration that especially a permanent disruption of communication can be realized when the transmitter electronics—or preferably the receiver electronics—are destroyed, thereby making communication between them impossible.

This approach of destroying an electronic system is already well known from the field of nonlethal destruction of targets. This approach involves the use not only of high-power microwave sources (HPM) but also of explosive-powered RF generators (RF=radio frequency), by means of which the electronics of a target are destroyed by a target-directed transmission of RF beams or their function is impaired by blinding or disturbing without the target itself being destroyed (DE 199 59 358 A1).

In principle, the method for disturbing/destroying the electronics for the interruption of communication can be carried out by utilizing the possibility of detecting electronics by NLJD (Nonlinear Junction Detector). This NLJD method has the ability to detect circuits built with semiconductor components. As a result of the nonlinear behavior of individual components, signals of a fixed frequency coupled into the circuit are converted to signals with a multiple of the radiated frequency and are reemitted. A method of this type and a corresponding nonlinear junction detector are described in detail in U.S. Pat. No. 6,163,259 A. Another nonlinear junction detector is disclosed by WO 02/065419 A1. Another patent, WO 2004/038455 A1, concerns a method and a device for detecting eavesdropping devices. In principle, the method works by evaluating a second and a third harmonic primary frequency reflected at the target. Information about the presence or absence of an electronic circuit is then derived from these two harmonics.

In continuation of the invention, so-called front-door coupling as well as back-door coupling is possible for permanent disruption of communication. In front-door coupling, the input and transmission stages of the receiver and transmitter are destroyed. In back-door coupling, the power can be coupled into the transmitting or receiving structure through slits, openings, and/or lines, such as signals lines, power supply lines, etc., thereby bringing about the destruction.

However, known NLJD systems operate on a fixed frequency. Therefore, to be able to guarantee effective destruction, the frequencies for optimal coupling should be known for both the front-door coupling and the back-door coupling.

Here, in another step, the invention takes up the idea of integrating tunable transmitters and detectors (receivers) in the detection systems and of using a narrow-band, variable-frequency signal for determining the frequencies for the optimal coupling.

If the detection system recognizes these frequencies, whether with the simple NLJD methods or the latter method, destruction of a transmitter communicating with the receiver of the target or destruction in the receiver itself can be initiated in the second step of the invention. For this purpose, after determination of the preferably optimal frequencies, for example, a high-power signal is transmitted into the local area of the target or the receiver with the determined/identified frequency.

The scannable frequency range should be selected for the detection and the subsequent destruction of the electronics in such a way that it includes both the theoretical limits for the back-door coupling (derivable from the geometry of the target) and the front-door frequencies typical for the communication systems. The frequency range is preferably 10-1,000 MHz. The receiving frequency for the second and third harmonics is readjusted according to the transmitting frequency.

One or more frequencies are preferably selected by the detection system for the attack on the basis of additional technical information, such as frequency plan, typical communication channels, etc., and nontechnical information, such as intelligence, blocked channels, etc. Moreover, the detection system determines the solid angle in which the target for the system is located. A broadband, tunable power transmitter then emits a broadband signal for destroying or attacking the target at the identified frequencies and in the defined solid angle.

If the target is a radio set, the receiving gain of the target can additionally be used if the transmission frequency lies within the receiving bandwidth of the target.

Closed systems, such as an IED, have the property of being able to communicate with the environment only through transmission windows/open doors/slots. As a result of the tunable transmitter/receiver of the detection system or systems, it is now possible to find the frequency holes or operating frequencies of a target, especially a shielded target.

Another advantage of this solution is that in environments in which devices with different frequencies are present, these frequencies are not considered for detection but rather are excluded during the scanning of the frequency. The method proceeds more quickly in this way.

By incorporating the back-door coupling, it is no longer absolutely necessary that the entire frequency range known to be used for communication be staked out, since the frequency range for the back-door coupling is very strongly dependent on the geometric dimensions of the target.

If electronic components in the target are destroyed, then the spectral emissions will also change. This creates the possibility, after execution or in suitable time windows during the irradiation, to measure the spectral emission and thus to be able to detect/confirm the destruction.

The invention will now be explained in greater detail with reference to the specific embodiment of the invention illustrated in the drawing.

BRIEF DESCRIPTION OF THE DRAWING

The single figure is a schematic representation of the invention.

DETAILED DESCRIPTION OF THE INVENTION

The sole FIGURE shows a device 10 with a detection system 1, here a nonlinear junction detector 1, which consists of at least one transmitter 1.1 and at least one receiver 1.2, which, in a preferred design, are installed in a housing 1.3, for detecting the electronics 2.1 of a target 2. Separate arrangements of transmitters 1.1 and receivers 1.2 are also possible. In addition, at least one additional transmitter 5 for emitting a transmission frequency $f_4$ for destroying the electronics 2.1 of the target 2 is integrated in the device 10. Reference number 20 designates a transmitter that is communicating with the target 2. Reference number 6 designates the evaluation unit. It controls the transmission frequency f and evaluates the signals reentering the detection system 1.

The junction detector 1 has at least one antenna 3, by which a narrow-band signal within a broadband of several 100 MHz can be emitted. This one antenna 3 is a broadband antenna that is capable of transmitting and receiving in both polarizations. The use of two or three antennas (not shown) is also possible, with, for example, each transmitter 1.1, 5 and each receiver 1.2 being assigned its own antenna.

Corresponding to the emitted frequency $f_1$, only signals of the frequencies $f_2=2*f_1$ and $f_3=3*f_1$ are received in the receiving range of the detector 1.2 and evaluated in the evaluation unit. In this regard, the frequency $f_1$ can be varied by an electronic unit 4 both linearly and in specific steps. This variation is continued until an optimal transmission frequency $f_1$ has been established. (This can be recognized from the fact that the two harmonics also reach the receiver 1.2 again with a maximum signal strength. In this regard, it can be assumed that the optimal transmission frequency $f_1$ as well as the harmonics coincide with the so-called frequency holes of the target 2 and represent the receiving bandwidth of the target.)

The target 2 is then irradiated with this optimal or optimized frequency $f_1$, and the presence of nonlinear circuits or components in the target 2 can be concluded from the transformed response in the detector 1.2. In addition, this optimized frequency $f_1$ allows greater distance measurement between the junction detector 1 and the target 2.

As a result of this target detection, the frequency range $f_4$ of the line of communication $S_k$ (receiving bandwidth) in the front door or the coupling window in the back-door region of the transmitter 20 and the location of the RCIED 21 (of target 2) are determined in the evaluation unit 6. After determination of the optimal frequencies by the evaluation unit 6, a high-power signal is transmitted by the transmitter 5 into the local region at the frequency $f_4$ determined by the detection system 1. In this way, the detected front-door or back-door frequency is coupled into the RCIED 21 of the electronic system 2.1, and the electronic components, preferably the receiving part, are destroyed.

In cases in which the input amplification of the target 2 is used, it is advisable to select a frequency that is typical for the communication of these targets 2.

The invention claimed is:

1. A device for permanent disturbance/destruction of communication between a transmitter and a receiver of an electronic system of a target, said device comprising: a detection system for detecting the electronic system of the target; and means for destroying the electronic system, wherein the detection system selects a variable frequency range for the detection and subsequent destruction of the electronic system so that the frequency range includes both theoretical limits for back-door coupling in the transmitter and front-door frequencies of the receiver of the target that are typical for the communication systems, and wherein the detection system determines a solid angle to the target, and the destroying means includes a transmitter that emits a broadband signal for destroying or attacking the target at determined frequencies and in the defined solid angle.

2. The device in accordance with claim 1, wherein the detection system is a nonlinear junction detector (NLJD) and includes at least one transmitter and one receiver, and has at least one antenna.

3. The device in accordance with claim 2, and further comprising a common housing, the transmitter and the receiver being arranged in the common housing.

4. The device in accordance with claim 2, wherein an electronic unit is integrated in the detection system, which electronic unit varies the frequency (f1) of the transmitter both linearly and in specific steps until an optimal transmission frequency ($f_1$) for detecting the electronic system of the target is established.

5. The device in accordance with claim 1, and further comprising an evaluation unit.

6. The device in accordance with claim 5, wherein the evaluation unit is integrated in the detection system.

7. The device in accordance with claim 1, wherein the detection system has at least one antenna for radiating the variable frequency ($f_1$) of the transmitter and for receiving the second and third harmonic frequencies reflected by the electronic system of the target.

8. The device in accordance with claim 7, wherein only one antenna is integrated in the detection system.

9. The device in accordance with claim 8, wherein the destroying means includes a transmitter that utilizes the antenna of the detection system to carry out the disturbance/destruction.

10. The device in accordance with claim 1, wherein the destroying means includes a transmitter that emits a narrow-band, high-power signal into a local area of the target by an antenna.

11. A method for the permanent disturbance/destruction of communication between a transmitter and a receiver of an electronic system of a target, the method comprising: a first step of detecting the electronic system of the target; and, a second step of destroying electronics of the electronic system, the detecting step including selecting a variable frequency range for the detection and subsequent destruction of the electronic system so that the frequency range includes both theoretical limits for back-door coupling in the transmitter and front-door frequencies of the receiver of the target that are typical for the communication systems, and wherein the detecting step further includes determining a solid angle to the target using a detection system, and the destroying step includes emitting a broadband signal from a transmitter for destroying or attacking the target at determined frequencies and in the defined solid angle.

12. The method in accordance with claim 11, wherein the detecting step includes emitting a variable frequency (f1) and receiving, in a receiving range of the receiver, only signals of frequencies ($f_2$, $f_3$) reflected from the electronic system as second and third harmonic frequencies and evaluating the received signals.

13. The method in accordance with claim 12, including varying the frequency ($f_1$) both linearly and in specific steps until an optimal transmission frequency ($f_1$) is established.

14. The method in accordance with claim 12, including preselecting at least one frequency for the attack based on additional technical information and nontechnical information so that the scannable frequency range can be limited.

15. The method in accordance with claim 14, wherein the additional technical information includes a frequency plan or typical communication channels.

16. The method in accordance with claim 14, wherein the additional nontechnical information includes a intelligence or blocked channels.

17. The method in accordance with claim 11, wherein the frequency range is 10-1,000 MHz.

18. The method in accordance with claim 11, further including checking effectiveness of the destroying step and selectively initiating additional irradiations/attacks.

* * * * *